Figure 1:
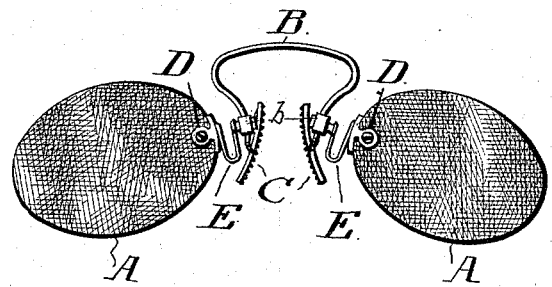

(No Model.)

I. FOX.
EYEGLASSES.

No. 527,275.

Patented Oct. 9, 1894.

WITNESSES:
N. E. Paige
C. Potter

Ivan Fox
INVENTOR
By his attorneys
Strawbridge & Taylor

UNITED STATES PATENT OFFICE.

IVAN FOX, OF PHILADELPHIA, PENNSYLVANIA.

EYEGLASSES.

SPECIFICATION forming part of Letters Patent No. 527,275, dated October 9, 1894.

Application filed August 5, 1892. Serial No. 442,211. (No model.)

*To all whom it may concern:*

Be it known that I, IVAN FOX, a citizen of the United States, residing in the city and county of Philadelphia, in the State of Pennsylvania, have invented certain new and useful Improvements in Eyeglasses, of which the following is a specification.

My invention has for its object the provision of means whereby the lenses of eye glasses may be accurately, and independently of the bow spring and nose rests, adjusted to the eyes of the wearer.

In the fitting of eye glasses, and, more especially, of those the lenses of which are calculated for the correction of astigmatism, it is, as is well known to opticians, essential for the best results that not only should the focal center of each lens coincide with the pupil of the eye, but also that its major or horizontal axis should register in parallelism with the longitudinal or major axis of the eye ball to which it is applied. It is also well known that the eyes of patients vary in position, one being frequently higher or lower, or, considered with reference to the nose, farther in or farther out, than the other. The noses of patients also vary in dimensions and in position, and it is rare that the bridges of the noses of any two persons correspond.

In the fitting of eye glasses for the correction of defective vision, it is of the first importance to satisfy the requirements, first, of adjusting the focal centers and axes of the lenses with respect to the pupils and axes of the eyes; and, second, of adjusting the nose pieces with which most eye glasses of the present day are provided, to the nose. It is also of importance in the treatment of strabismus without prisms, to be able to de-center spherical or cylindric lenses in the use of such lenses for the correction of the condition named.

Various appliances have been resorted to to enable the optician to accurately adjust the nose pieces of eye glasses, and I may premise that in connection with my invention any such means of adjusting the nose pieces, when employed, may be adopted. My invention, however, comprehends means by which the lenses themselves may be independently or separately adjusted relatively to the bow spring, or to the bow spring and nose pieces when the latter are employed, and also with respect to the eyes of the wearer, without regard to whether such adjustment be vertical, horizontal, oblique, or from front to rear.

The broad idea which underlies my invention is the provision of an adjustable lens-support intermediate of and connective between a given lens on the one hand and the bridge spring and nose rests, when nose rests are employed, on the other,—by the adjustment and manipulation of which support it becomes possible to adjust in any desired manner each lens independently of the other and also of the bridge spring.

In the drawings I show and herein I describe, a good form of a convenient embodiment of my invention, the particular subject matter claimed as novel being hereinafter definitely specified.

Figure 2:
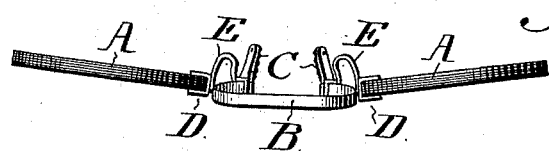
Figure 3:
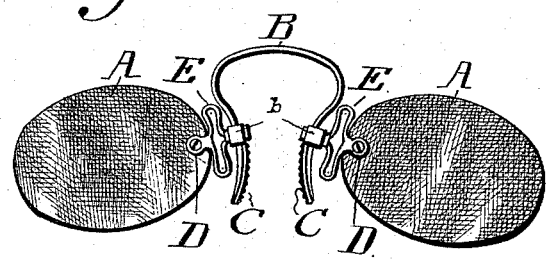

In the drawings, Figure 1 is a view in front elevation of a pair of glasses embodying my invention. Fig. 2 is a plan or edge view of the same. Fig. 3 is a view in front elevation of a pair of glasses embodying a modified form of my invention.

Similar letters of reference indicate corresponding parts.

In the drawings, A A are the lenses, B the bridge spring, and C the nose pieces.

D are the clamps, which are attached to the rimless lenses illustrated. A somewhat different form of clamp is usually employed in connection with rim-provided lenses.

As hereinafter mentioned, my invention comprehends broadly the provision of adjustable lens-supports intermediate of and connective between the bridge spring and the lenses; and comprehends as a preferred embodiment of such construction the provision of members or bars E of pliable or bendable metal, preferably looped, coiled, or curved, situated, respectively, between the bridge spring on the one hand and the lenses on the other, and each of which is securely attached to the lens which it carries or to its clamp or rim, and also to the bridge spring or to a clamp *b* on the end of said spring.

In eye glasses the lenses of which are, in accordance with my invention, connected to the bridge spring by curved bars of pliable metal, any desired adjustment of the lenses may be accomplished, as will be obvious, by the bending or manipulation of the pliable bars to throw the lenses in the desired direction, laterally, vertically, obliquely, or forward or rearward. Any preferred pliable or bendable metal may be employed. Any preferred form may be given to the pliable bars. I prefer, however, to form them as U-shaped loops, and to extend their body portions somewhat toward the eyes of the wearer out of the plane of the lenses, as shown in Figs. 1 and 2. As will be understood, when the pliable bars are employed, the most delicate adjustment of the lenses may be attained, and when attained is permanent.

As will be understood, in fitting ordinary glasses to a wearer, the setting of the bridge spring and nose pieces to fit the nose tends to derange the set of the lenses, while, on the other hand, the setting of the lenses to fit the eyes, tends to diminish the accuracy of the fit of the bridge and nose pieces. In my improved eye glasses, however, the pliable bars may be bent to bring their free extremities, which carry the lenses, into any desired relationship to the bridge-spring which is their base or foundation, so to speak,—without affecting the set of the nose pieces, while the nose pieces may be manipulated without affecting the set of the lenses.

In Fig. 3 I show a modified arrangement of my invention, which illustrates one of the specific forms in which the bar of pliable metal may be embodied and applied,—and also indicates to some degree the wide range of forms in which it is possible to embody the invention. In said modified form each bar is shown as embodying two oppositely disposed U-shaped loops, the respectively opposing extremities of which meet and merge into each other at the points of attachment to the lens and bridge respectively.

My improved eye glasses are characterized by extreme simplicity, and provide a connection between the bridge-spring and the lenses which while sightly and durable is yet susceptible of easy and accurate manipulation for adjustment,—and embodies the minimum number of parts.

Having thus described my invention, I claim and desire to secure by Letters Patent—

1. An eye glass in which are combined:—first, a bridge spring provided with nose pieces;—second, lenses;—and, third, lens-supports formed of pliable or bendable non-resilient metal and interposed between and connective of the bridge spring and the respective lenses,—substantially as and for the purposes set forth.

2. In an eye-glass, in combination:—first, a bridge spring;—second, lenses;—and, third, lens-supports consisting of U-shaped loops of pliable or bendable and non-resilient metal interposed between and connective of the bridge spring and the respective lenses,— substantially as set forth.

3. In an eye-glass, in combination:—first, a bridge spring;—second, lenses;—and, third, lens-supports consisting of U-shaped loops of pliable or bendable and non-resilient metal, the bights of which extend out of the planes of the lenses, and which are connective of the bridge spring and said lenses,—substantially as and for the purposes set forth.

In testimony that I claim the foregoing as my invention I have hereunto signed my name this 23d day of July, 1892.

IVAN FOX.

In presence of—
F. NORMAN DIXON,
R. M. RUSSELL.